United States Patent
Kock

(10) Patent No.: US 7,463,897 B2
(45) Date of Patent: Dec. 9, 2008

(54) MESSAGE DATA IN MOBILE COMMUNICATION SYSTEMS

(75) Inventor: Martijn Willem Maria Kock, Amsterdam (NL)

(73) Assignee: Koninklijke KPN N.V., The Hague (NL)

( * ) Notice: Subject to any disclaimer, the term of this patent is extended or adjusted under 35 U.S.C. 154(b) by 18 days.

(21) Appl. No.: 10/769,529

(22) Filed: Jan. 30, 2004

(65) Prior Publication Data

US 2004/0185885 A1    Sep. 23, 2004

Related U.S. Application Data

(60) Provisional application No. 60/444,484, filed on Feb. 3, 2003.

(51) Int. Cl.
| | |
|---|---|
| H04Q 7/20 | (2006.01) |
| H04Q 7/22 | (2006.01) |
| H04L 12/58 | (2006.01) |
| H04M 1/725 | (2006.01) |
| H04M 1/64 | (2006.01) |
| H04J 3/12 | (2006.01) |

(52) U.S. Cl. .................... 455/466; 455/412.1; 370/522; 379/88.2

(58) Field of Classification Search ................. 370/522; 379/88.2; 455/414.1, 412.1, 466
See application file for complete search history.

(56) References Cited

U.S. PATENT DOCUMENTS

| | | | | |
|---|---|---|---|---|
| 6,052,784 A * | 4/2000 | Day | ............................ | 726/22 |
| 6,771,749 B1 * | 8/2004 | Bansal et al. | ............ | 379/88.17 |
| 6,795,711 B1 * | 9/2004 | Sivula | .......................... | 455/466 |
| 6,976,102 B1 * | 12/2005 | Groen et al. | .................. | 710/72 |
| 2002/0075844 A1 * | 6/2002 | Hagen | ........................ | 370/351 |
| 2002/0126708 A1 * | 9/2002 | Skog et al. | ................... | 370/522 |
| 2002/0132608 A1 * | 9/2002 | Shinohara | ................... | 455/412 |
| 2002/0138545 A1 * | 9/2002 | Andreakis et al. | ........... | 709/200 |
| 2003/0067939 A1 * | 4/2003 | Feuerstraeter et al. | ....... | 370/465 |
| 2003/0119540 A1 * | 6/2003 | Mathis | ........................ | 455/518 |
| 2004/0203956 A1 * | 10/2004 | Tsampalis | ................... | 455/466 |
| 2005/0020286 A1 * | 1/2005 | Lazaridis et al. | ............ | 455/466 |

* cited by examiner

*Primary Examiner*—Vincent P Harper
*Assistant Examiner*—Ariel Balaoing
(74) *Attorney, Agent, or Firm*—McDonnell Boehnen Hulbert and Berghoff LLP

(57) ABSTRACT

In a mobile telecommunications system (100) capable of transmitting message data a sending device (102) and a receiving device (106) may have different message data handling capabilities. By informing the sending device of the message data handling capabilities of the receiving device, the user of the sending device can select the message data to be transmitted to the receiving device on the basis of these capabilities. In this way it is avoided that a device receives message data it cannot handle or that the network (104) has to transcode the message data.

14 Claims, 4 Drawing Sheets

MESSAGE DATA IN MOBILE COMMUNICATION SYSTEMS

PRIORITY

The present patent application claims priority under 35 U.S.C. § 119(e) to U.S. Provisional Patent Application 60/444,484 filed on Feb. 3, 2003 entitled "Mobile Generic Status," the full disclosure of which is incorporated herein by reference.

FIELD OF THE INVENTION

The present invention relates to messaging in mobile communication systems. More in particular, the present invention relates to a method, a device and a system for transmitting data, such as user message data, in a communication system, such as a mobile telephone system.

BACKGROUND

It is known to exchange data, such as message data, between mobile devices (also known as "mobile terminals") in a communication system, such as a mobile (otherwise known as a "cellular") telephone system. In GSM networks, for example, it is possible to exchange simple text messages between mobile devices. Such text messages utilize GSM's Short Message Service (SMS) and are typically limited to 160 characters. Modern mobile networks often also allow richer messages containing pictures or audio to be transmitted between mobile devices. However, the extent to which these additional types of messages can be used depends on the mobile devices involved.

There are many types of mobile devices which may have various capabilities. For example, some mobile devices are only able to place and receive calls. However, other mobile devices also have data capabilities, such as the ability to display text, display graphics, play sound and/or access the Internet.

Additionally, different mobile devices may be able to receive different types of formatted data. For example, some mobile devices may support data formats such as .gif, .jpg, .mpeg, .midi, .wav, while others may support only some or none of these formats. There may also be differences regarding the size of message that a particular mobile device can support. Further, there can be differences in the message attributes supported by mobile devices. For example, some mobile devices may support delivery notification, while others may not. With all of these differences, a user of a mobile device sending a message to a receiving mobile device may not know whether and how the message will appear on the receiving mobile device. The format of the message when it is received may be quite different from the format of the message when it was sent.

To tackle these incompatibilities, networks may offer the possibility of transcoding individual components of data messages or their attachments. Transcoding typically involving re-formatting components of a data message, which may make it possible for a receiving device to interpret the sequence of transcoded components and hence the content of a message, even if the message originally contained components that were not suitable for the receiving device. However, the format of the message may be changed using the transcoding. In addition, transcoding requires relatively complicated data processing which involves additional hardware and software and which increases the handling time and cost. Also, the message may be corrupted by the transcoding process.

It is an object of the present invention to overcome these and other problems of the Prior Art and to provide a method of transmitting data in a communication system that allows data messages to be exchanged between devices having distinct capabilities while avoiding transcoding of the data messages.

It is another object of the present invention to provide a device and a mobile communication system in which said method is utilized.

SUMMARY

Accordingly, the present invention provides a method of transmitting message data in a mobile communication system comprising a network, at least one sending device capable of exchanging message data with the network and at least one receiving device capable of exchanging data with the network, each device having a set of message data handling capabilities, the method comprising the step of informing the sending device of the message data handling capabilities of the receiving device so as to allow the sending device to only transmit message data matching the message data handling capabilities of the receiving device.

By informing the sending device of the capabilities of the receiving device, it is possible to send message data that can be handled by the receiving device, thus removing the need for any transcoding of the message data. In addition, sending message data that cannot be handled by the receiving device can be avoided, thus preventing data loss and eliminating the unnecessary transmission of incompatible data. As a result, the user-friendliness of the mobile service is enhanced as the user messages will be received substantially as they were sent ("what I send is what you receive"), and the amount of data processing required by the network is reduced.

It is noted that in the Prior Art matching the message data and the capabilities of the receiving device is typically carried out in the network, for example in an exchange, or in the receiving device itself. In contrast to this, the matching of the message data and the capabilities of the receiving device according to the present invention takes place in the sending device, that is, prior to the transmission of the message data.

For the avoidance of doubt it is noted that the term "device" as used in this document refers to a terminal (typically but not necessarily a user device) that is connected or connectable to a communication network. Also, the term "network" is meant to include any auxiliary devices and services associated with the physical network and its exchanges, such as (mail) servers, mediation platforms, servers for value added services, etc. The term "mobile communication system" is meant to refer to a communication system which is particularly but not exclusively suitable for mobile (also known as "cellular") communication, a "mobile communication system" as intended in this document may therefore also comprise fixed ("land-line") terminals. Furthermore, the term "mobile terminal" is not confined to mobile (or "cellular") telephones but may also refer to devices capable of communicating with a mobile communication system as defined above. Examples of such mobile terminals may be devices built into cars to communicate service conditions, parking meters to communicate their status (ready/full /out of service).

The message data handling capabilities of the receiving device may in accordance with the present invention be presented to a user of the sending device. These message data handling, which may include a maximum data length, the presence of a codec (coder /decoder) for a particular data format, and/or other parameters, allow the user to select those message parts that can be received and rendered by the receiving device. Accordingly, if the sending mobile device knows the capabilities of the receiving mobile device, the user of the sending mobile device may select appropriate message composing options from the options presented to her.

Additionally, or alternatively, the message data handling capabilities of the receiving device may be conveyed to the sending device to automatically select message data to be transmitted in accordance with the message data handling capabilities of the receiving device. Accordingly, in addition to or instead of (manual) selection by the user, (automatic) selection by the sending mobile device may be provided.

In a preferred embodiment, the message data handling capability comprises at least one of:
 the capability of handling still images,
 the capability of handling video data or animations,
 the capability of handling sound data,
 the capability of handling (simple) text data, and
 the capability of handling layout formats,
but preferably all of the above capabilities. It will be understood that other capabilities may also be provided, such as the capability of receiving broadcasts (for example digital television broadcasts), and that each capability may be differentiated with respect to various sound, video or text formats. The present invention allows any of a number of message data formats to be handled, provided the sending device and the receiving device both support the particular format.

The layout formats mentioned above may include well-known formats such as HTML, XML, SMILE, etc.

Advantageously, descriptions of the capabilities of at least two receiving devices may be stored in a sending device. That is, information indicative of the message data handling capabilities of at least two but preferably a plurality of devices is stored in a sending device. This allows a sending device to have the capabilities available when composing a message.

Advantageously, the stored descriptions of capabilities are linked to a list of user identifications (IDs), for example telephone numbers. That is, a list of user identifications is stored in the mobile device and each item of the list contains a link to stored descriptions of capabilities. The list of user identifications is preferably part of a so-called address book that contains further information on the subscribers whose numbers are listed. It will be understood that some of the links to stored descriptions of capabilities may be void as the capabilities of some mobile devices may not be known. It is preferred, however, that a description of the capabilities of each mobile device associated with a stored user identification are also stored.

Advantageously, the stored descriptions of capabilities may be updated at regular time intervals. Alternatively, or additionally, the stored descriptions of capabilities may be updated when a change in the capabilities of the receiving device has occurred. Accordingly, an update may take place after a certain time interval has elapsed, for instance a day, a week or a month, or immediately upon detection of a change by the network. Preferably the descriptions of capabilities stored in a device are updated each time a new user identification (e.g. a new telephone number) is associated with that particular device, for example when replacing the SIM (Subscriber Identity Module) in GSM mobile devices. That is, each time a device receives a new user identification it may send a description of its capabilities to a number of other devices so as to update their description of its capabilities.

When composing a message, the sending device may retrieve the descriptions of the capabilities of the receiving device from local storage (a memory in the sending device), from the network or from the receiving device via the network. Preferably, the descriptions of the capabilities are retrieved from a memory in the sending device so as to reduce the amount of data exchanged with the network.

In order to protect the privacy of the user, the receiving device may only transmit a description of its capabilities in response to an authorisation. Thus an authorization process may precede the transmission of capabilities. The authorization process may involve an identification of (the user of) the sending (capabilities requesting) device, a password, a cryptographic key and/or other data.

The present invention further provides a device for use in a system for mobile communication, the device comprising means for exchanging message data with a network, means for handling message data, and means for matching message data with capabilities of corresponding devices. It is noted that these corresponding devices typically are mobile devices which are also capable of exchanging messages with the network or at least receiving messages from the network. The said means for exchanging message data, means for handling message data and means for matching message data may be implemented in hardware but are preferably software program units executed by a microprocessor.

Advantageously, the device of the present invention may further comprise means for storing capabilities of corresponding devices. Alternatively, or additionally, the device may comprise means for retrieving capabilities of corresponding devices.

It is preferred that the device is further arranged for exchanging message data containing video or animation data, still image data, sound data and/or (simple) text data.

In addition, the present invention provides a computer program product for controlling a device as defined above. The computer program product may comprise a data carrier, such as a CD or a DVD, containing a computer program suitable for controlling a mobile device in accordance with the present invention.

The present invention also provides a system for mobile communication, the system comprising a network, at least one sending device capable of exchanging message data with the network and at least one receiving device capable of exchanging message data with the network, each device having a set of message data handling capabilities, the system being arranged for informing the sending device of the message data handling capabilities of the receiving device so as to allow the sending device to only transmit message data matching the message data handling capabilities of the receiving device.

It is noted that the present invention is primarily directed at user composed data messages, that is, data messages composed (typed and/or selected) by a user of the terminal. Such user composed data messages typically comprise text, images, video and/or audio segments. The present invention could also be applied to automatic data messages, that is, data messages initiated by the terminal itself in response to a timing signal or a network request. Automatic data messages typically comprise terminal or network status data and/or call data.

BRIEF DESCRIPTION OF THE DRAWINGS

The present invention will further be explained below with reference to exemplary embodiments illustrated in the accompanying drawings, in which.

DETAILED DESCRIPTION

Figure 1:
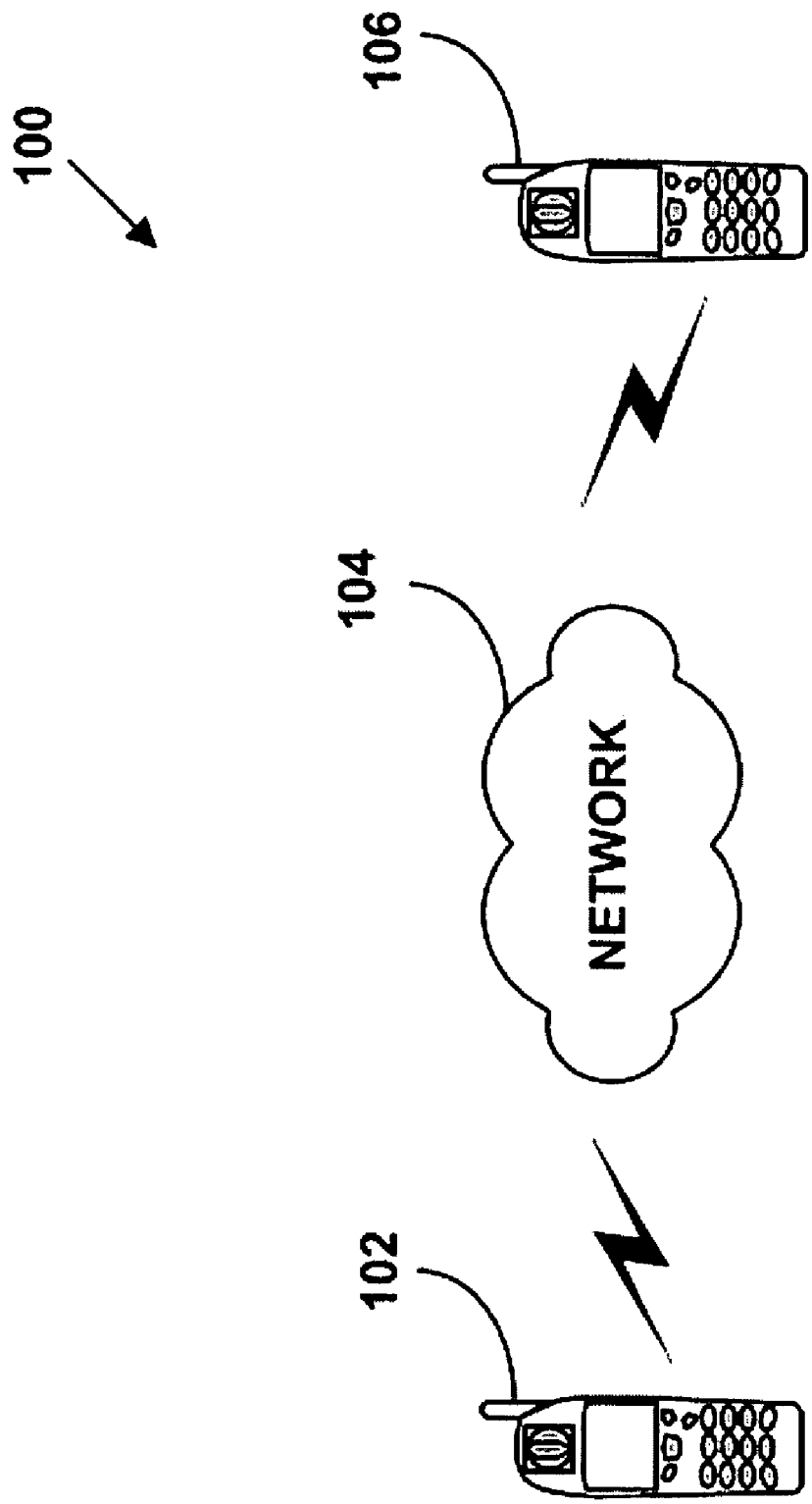
FIG. 1 schematically shows a block diagram of an exemplary communication system in which the present invention may be used.

The mobile communication system 100 shown merely by way of non-limiting example in FIG. 1 may include a sending mobile device 102, a network 104, and a receiving mobile device 106. The sending mobile device 102 and the receiving mobile device 106 are depicted in FIG. 1 as mobile (cellular) telephones. However, the mobile devices 102, 106 may be any device capable of transmitting and receiving communications. The network 104 may be a so-called wireless network, which may contain a variety of entities as is well known in the art, such as exchanges, wired connections, transmitters, and receivers. The network 104, which is suitable for communicating with mobile devices, may additionally comprise auxiliary devices such as mail servers, servers for value added services, mediation platforms, etc.

The sending mobile device 102 may wish to send a message to the receiving mobile device 104. The message may include sound (for example voice or music), text, control data, and/or images (graphics). While the sending mobile device 102 may be capable of sending and receiving voice, data, and graphics, the receiving mobile device 106 may or may not be capable of receiving a message in the formats supported by the sending mobile device 102.

According to the present invention, the intelligence of "how my message will be received" is brought to the sending mobile device 102. Accordingly, the user of the sending mobile device 102 may know the mobile device features of the receiving mobile device 106 at the time of composing the message. As a result, the user of the sending mobile device 102 may tailor the message so that the user will know how the message will appear on the receiving mobile device 106. Alternatively, or additionally, the sending device 102 may itself alter the message so as to match the capabilities of the receiving device.

The capabilities of the receiving device 102 may be entered in a status list. The status list may consist of status indicators linked to a description of the receiving mobile device 106. The status indicators may be a collection of parameters indicative of the capabilities of the receiving mobile device 106. In addition to the technical (device defined) capabilities discussed above, the status indicators may also indicate non-technical (user defined) capabilities or constraints including, for example, an on-line status of a buddy (e.g., "in meeting," "off-line," "on-line"), a location (e.g., home, address), a mood (e.g., happy), or any other relevant status indicator. The mood of the user of the receiving device may for example be used to determine whether to send a text message or an audio message, while sending a video message may depend on the location (home/car/meeting) of the receiving device's user.

The status indicators may be visible or invisible to the receiving mobile device. Although the status list may contain the status indicators (that is, capabilities) of only a single receiving device, in typical embodiments a status list will contain the capabilities of a plurality of receiving devices.

Typical capabilities are, for example, the capability of handling still images, the capability of handling video data or animations, the capability of handling sound data, the capability of handling (simple) text data, the capability of handling layout formats, and the capability of receiving broadcasts (for example digital television broadcasts). Each capability may be differentiated with respect to various sound, video or text formats. The present invention allows a variety of message data formats to be handled, provided the sending device and the receiving device both support the particular format. In mathematical terms the present invention can be expressed as follows. Assume that there is a set C of n different capabilities cl . . . cn that a terminal may possess. Each terminal (for example device 102 or 106) will have a subset of these n capabilities. Accordingly, the sending device will have a subset Cs and the receiving device will have a subset Cr. The matching capabilities are those which are elements of the intersection Cm of the subsets Cs and Cr. Accordingly, the user of the sending device can compose and/or select the message components that comply with the set Cm of matching capabilities.

It will be understood that the set Cm of matching capabilities will tend to have fewer elements if a message is to be sent to more than one receiving device: if two (or more) receiving devices with capabilities subsets Cr and Cr' are involved, the set Cm of matching capabilities will be the intersection of Cs, Cr and Cr'.

Figure 2:
FIG. 2 schematically shows an exemplary embodiment of a status list comprising device capabilities in accordance with the present invention.

FIG. 2 provides an example of a status list 200. The status list 200 may include more or less information than is depicted in FIG. 2, as FIG. 2 is provided only as an example.

The status list 200 may be stored in memory. The storage location of the status list 200 may be in one of several locations. For example, the status list 200 may be stored on the network 104. In this scenario, the sending mobile device 102 may retrieve the necessary information regarding the receiving mobile device 106 when the user of the sending mobile device 102 is composing the message.

As another example, the status list 200 may be stored in memory on the sending mobile device 102. In this scenario, the sending mobile device 102 may keep a local storage of the receiver capabilities in the memory of the mobile device 102. Alternatively, the information may be stored on a Subscriber Identity Module (SIM) card located in the mobile device 102. Other storage locations may also be possible.

An authorization mechanism may be used to protect the privacy of the end-user of the receiving mobile device 106. The authorization mechanism may prevent abuse of status indicators, including the receiving mobile device 106 capabilities, by third parties. The end-user of the receiving mobile device 106 may control who may receive his status indicators. The end-user may limit access to his status indicators by requiring the sending mobile device 102 to have an explicit confirmation from the receiving mobile device 106. Additionally, authorization may be limited to a subset of the status indicators.

An end-user of a receiving mobile device 106 may make changes to his status indicators. This may occur if an end-user changes his mobile device 106, or for any other reason. Accordingly, the end-user may update his information on any status list 200 that included his information.

There may be a mechanism of automatically informing the sending mobile device 102 that a change in message capabilities of the receiving mobile device 106 has been detected. For example, an update may be initiated by a change in the mobile device features of the receiving mobile device 106. In this example, the SIM card may have been moved from mobile device to another. The status list 200 may need to be updated for both mobile devices involved in the transfer of the SIM card. Other changes may also require an update to the status list 200. Alternatively, or additionally, an update may automatically be initiated when a predetermined time period has elapsed.

If the status list 200 is stored on the network 104, the network 104 may be notified of the change. If the network 104 has knowledge of which mobile devices have included information regarding the changing mobile device on their status lists, the network 104 may forward the change information to those mobile devices. For example, the network 104 may know that the sending mobile device 102 has a status list 200 that contains information regarding the receiving mobile device 106. Accordingly, the network 104 may inform the sending mobile device 102 of the changes to the receiving mobile device 106.

Alternatively, if the changing mobile device has knowledge of those mobile devices that have included it on their status list, the changing mobile device can initiate the update. For example, the receiving mobile device 106 may know that the sending mobile device 102 has a status list 200 that contains information regarding the receiving mobile device 106. Accordingly, the receiving mobile device 106 may inform the sending mobile device 102 of the changes to the receiving mobile device 106.

To reduce the amount of data that has to be transmitted during an update, it is advantageous if each device is assigned a class, each class having a predetermined set of capabilities. Thus the update information may only comprise the new class identifier, for example "X37", both the sending and the receiving device containing a list of classes and their associated capabilities or a list of capabilities and their associated classes. Alternative schemes are possible, for example one in which the receiving device notifies the network of an added or deleted capability, the network than matching the updated set of capabilities of the receiving device with a class, and the network then sending the class identifier to the sending device.

Figure 3:
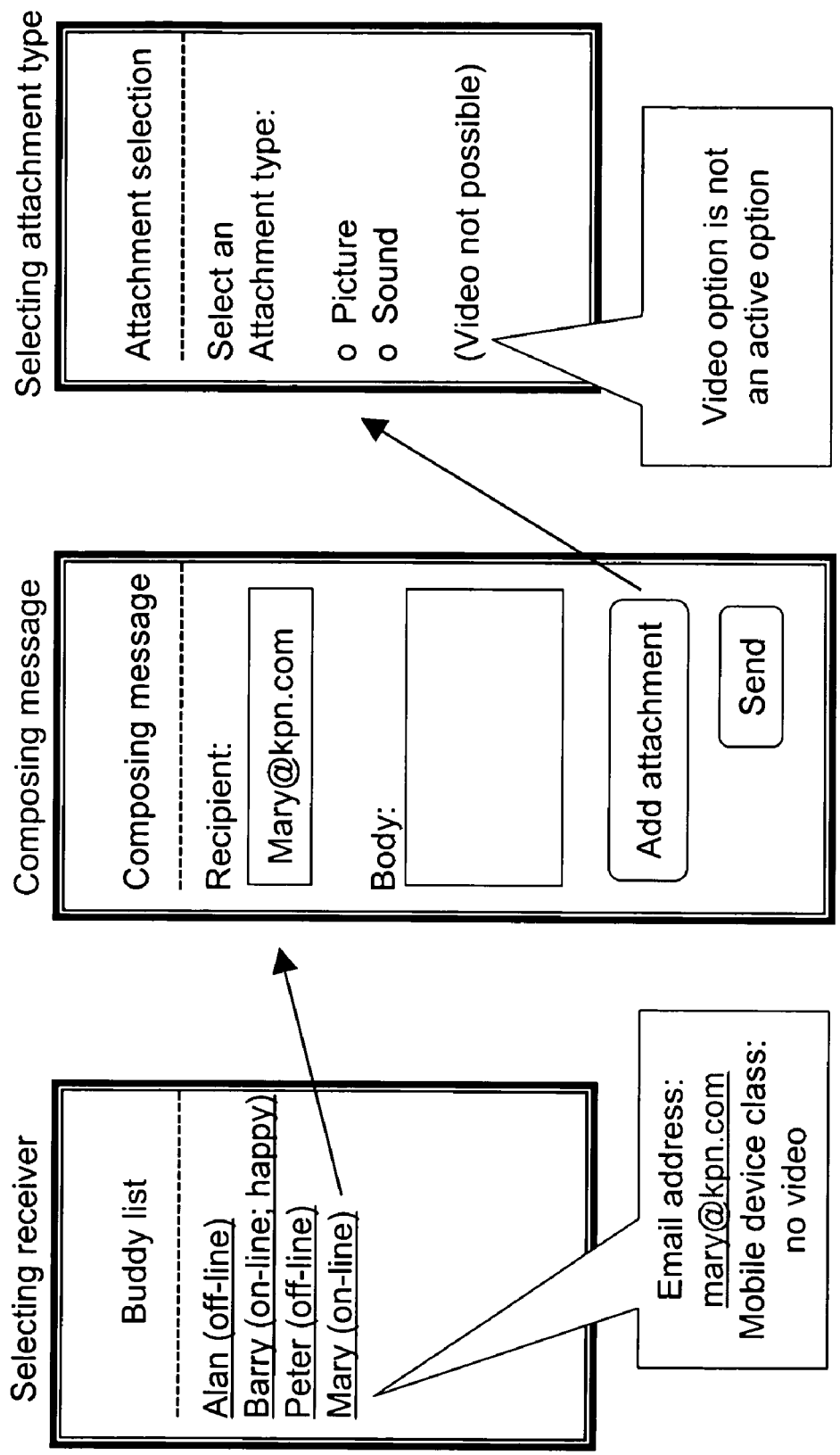
FIG. 3 schematically shows an exemplary use of a sending mobile device in accordance with the present invention.

FIG. 3 is a pictorial representation of the application of a sending mobile device, which may be used to illustrate an example of sending a message in accordance with the present invention. In this example, suppose John wishes to send Mary a message. John will compose the message on his mobile device. Mary is on John's "buddy list", that is, in (a section of) the address book stored on John's mobile device or its SIM card. John selects Mary from his buddy list. John also has Mary on his status list. When John selects Mary from his buddy list, John also sees that Mary does not have video capability. Although John's mobile device supports attaching video clips to messages, Mary's mobile device does not. John will know not to send Mary a message with a video clip. John's mobile device may provide the options that Mary's mobile device can accept, hiding or indicating as inactive the options which are not available. John may send a message in a format that Mary's mobile device can receive. For example, John may send Mary a picture message instead.

Figure 4:
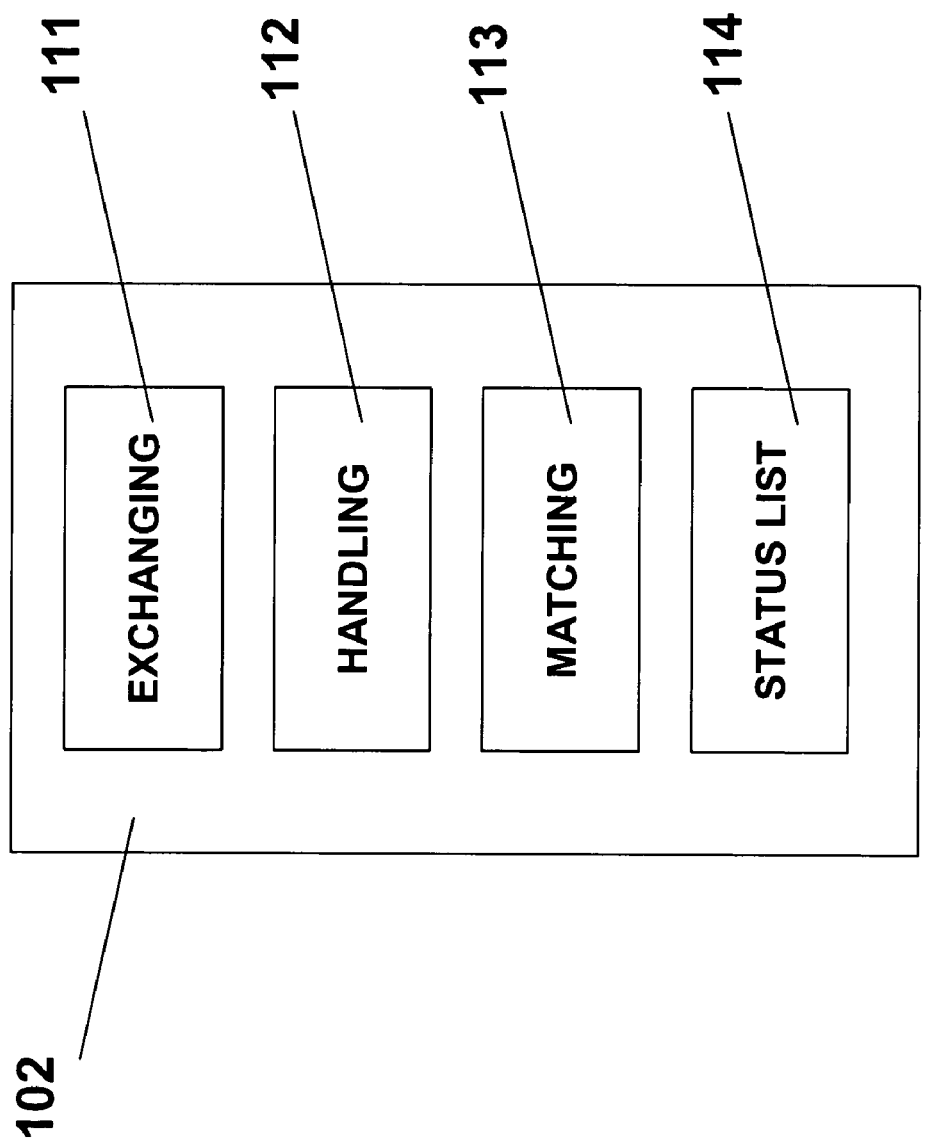
FIG. 4 schematically shows a block diagram of an exemplary embodiment of a sending mobile device in which the present invention is utilized.

In FIG. 4 some of the functions of an exemplary sending mobile device 102 are schematically illustrated. The device 102 is shown to comprise means 111 for exchanging message data with a network, means 112 for handling message data, and means 113 for matching message data with capabilities of corresponding devices. The means 111 for exchanging messages may comprise input/output means which are well known in the art. The means 112 for handling message data may comprise means for composing messages, including hardware components such as a keypad, and electronic means for assembling message parts. These means 112 may further comprise suitable means for receiving data (status indicators) on the capabilities and status of corresponding devices and storing the status indicators, for example in a status list 114. The means 113 for matching message data with capabilities of corresponding devices in accordance with the present invention may comprise comparator means for comparing message data with capabilities data (status indicators). Advantageously, when composing a message the device 102 automatically produces a message profile stating message properties such as the constituent parts of the message (for example text and video) and the length of these message parts (for example the number of bytes of the text part).

At least part of the said means 111, 112 and 113 may be software program units executed by a suitable microprocessor of the device 102. It will be understood that the device 102 also comprises a memory for storing the software program units, the status list, message components, and other information. In addition the device 102 comprises the usual mobile telephone components such as an antenna, a display, a microphone, a speaker, etc. It is noted that the receiving device 106 of FIG. 1 may be structurally identical to the sending device 102, but this is not necessary. The receiving device 106 should at least comprise means for informing the sending device 102 of its capabilities.

The present invention is based upon the insight that the message data compatibility of sending and receiving mobile devices can be checked at the sending device instead of in the network. This increases the efficiency of the transmissions and minimizes data loss. In addition, the transcoding of data messages in the network is no longer necessary.

The present invention can be applied in various mobile networks, such as GSM and UMTS networks. It is even possible for at least one of the terminals to be a non-mobile device, as increasingly fixed (that is, non-mobile or "land line") networks offer the possibility of exchanging text messages and other data between fixed terminals. The present invention can be utilized to exchange data between mobile terminals, between a mobile and a fixed terminal and even between two (or more) fixed terminals.

It will therefore be understood by those skilled in the art that the present invention is not limited to the embodiments illustrated above and that many modifications and additions may be made without departing from the scope of the invention as defined in the appending claims.

The invention claimed is:

1. A method of transmitting message data in a mobile communications system comprising a network, at least one sending device capable of exchanging message data with the network and at least one receiving device capable of exchanging message data with the network, each device having a respective set of message data format handling capabilities, the method comprising the steps of:

at a sending device, receiving a set of message data format handling capabilities of a receiving device, the set of message data format handling capabilities of the receiving device being provided only if authorized;

at the sending device, storing the received set of message data format handling capabilities of the receiving device, thereby creating a stored set of message data format handling capabilities of the receiving device;

at the sending device, detecting a user selecting the receiving device as the destination of a message, wherein the message is in a given data format chosen from the group comprising (I) still images, (ii) video, (iii) animations data, (iv) sound data, (v) text data, and (vi) layout formats;

at the sending device, in response to the detection, comparing the stored set of message data format handling capabilities of the receiving device with message data format handling capabilities of the sending device;

at the sending device, indicating the message data formats that are supported by both the sending device and the receiving device as options for attaching files to the message.

2. The method according to claim 1, further comprising preventing the user from choosing a message data format not supported by both the sending device and the receiving device.

3. The method according to claim 1, further comprising presenting the stored set of message data handling capabilities of the receiving device to the sending device so as to automatically select message data to be transmitted in accordance with the stored set of message data handling capabilities of the receiving device.

4. The method according to claim 1, further comprising linking the stored set of message data format handling capabilities of the receiving device to a list of user identifications.

5. The method according to claim 1, further comprising updating the stored set of message data format handling capabilities of the receiving device at regular time intervals.

6. The method according to claim 1, further comprising updating the stored set of message data handling format capabilities of the receiving device_when a change in the capabilities of the receiving device has occurred.

7. The method according claim 1, wherein the receiving device is a mobile device.

8. A sending device for use in a mobile communications system, the sending device comprising:

means for exchanging message data with a network;

means for handling message data;

means for receiving a set of message data format handling capabilities of a receiving device, the set including at least one of handing (i) still images, (ii) video, (iii) animations data, (iv) sound data, (v) text data, and (vi) layout formats, wherein the message data format handling capabilities of the receiving device is provided in response to an authorization;

means for storing the set of the message data format handling capabilities of the receiving device thereby creating a stored set of the message data format handling capabilities of the receiving device;

means for allowing the receiving device to be chosen from a list of devices;

means for comparing the stored set of the message data format handling capabilities of the receiving device with a set of the message data format handling capabilities of the sending device so as to create a set of matching capabilities, in response to choosing the receiving device;

means for indicating the message data formats that are supported by both the sending device and the receiving device as options for attaching files to the message; and means for transmitting the message with attached files of the message data formats in the set of matching capabilities to the receiving device.

9. The sending device according to claim 8, further comprising means for retrieving the stored set of the message data format handling capabilities of the receiving device.

10. The sending device according to claim 8, wherein the sending device includes:

a processor;

data storage; and machine language instructions stored in the data storage and executable by the processor to:

exchange message data with a network; handle message data; and compare message data format handling capabilities.

11. A system for mobile communications, the system comprising:

a network;

at least one sending device capable of exchanging message data with the network; and at least one receiving device capable of exchanging message data with the network, each device having a respective set of message data format handling capabilities, each respective set including at least one of handing (i) still images, (ii) video, (iii) animations data, (iv) sound data, (v) text data, and (vi) layout formats, wherein the system is arranged for informing a sending device of the set of message data format handling capabilities of a receiving device, the set of message data format handling capabilities of the receiving device being provided only if authorized, and wherein the sending device operates to:

(a) store the set of message data format handling capabilities of the receiving device thereby creating a stored set of message data format handling capabilities of the receiving device;

(b) detect a user of the sending device selecting the receiving device as the destination of a message;

(c) in response to this detection, compare the stored set of message data format handling capabilities of the receiving device with the message data format handling capabilities of the sending device; and (d) indicate the message data formats that are supported by both the sending device and the receiving device as options for attaching files to the message.

12. The method according to claim 1, further comprising updating the stored set of message data format handling capabilities of the receiving device when a SIM card has been changed in the receiving device.

13. The device according to claim 8, farther comprising means for updating the stored set of message data format handling capabilities of the receiving device responsive to a SIM card being changed in the receiving device.

14. The system of claim 11, wherein the stored set of message data format handling capabilities of the receiving device are updated responsive to a SIM card being changed in the receiving device.

* * * * *